June 18, 1946.   D. W. KELBEL   2,402,164
HYDRODYNAMIC COUPLING COMBINED WITH GEARING
Filed March 21, 1944
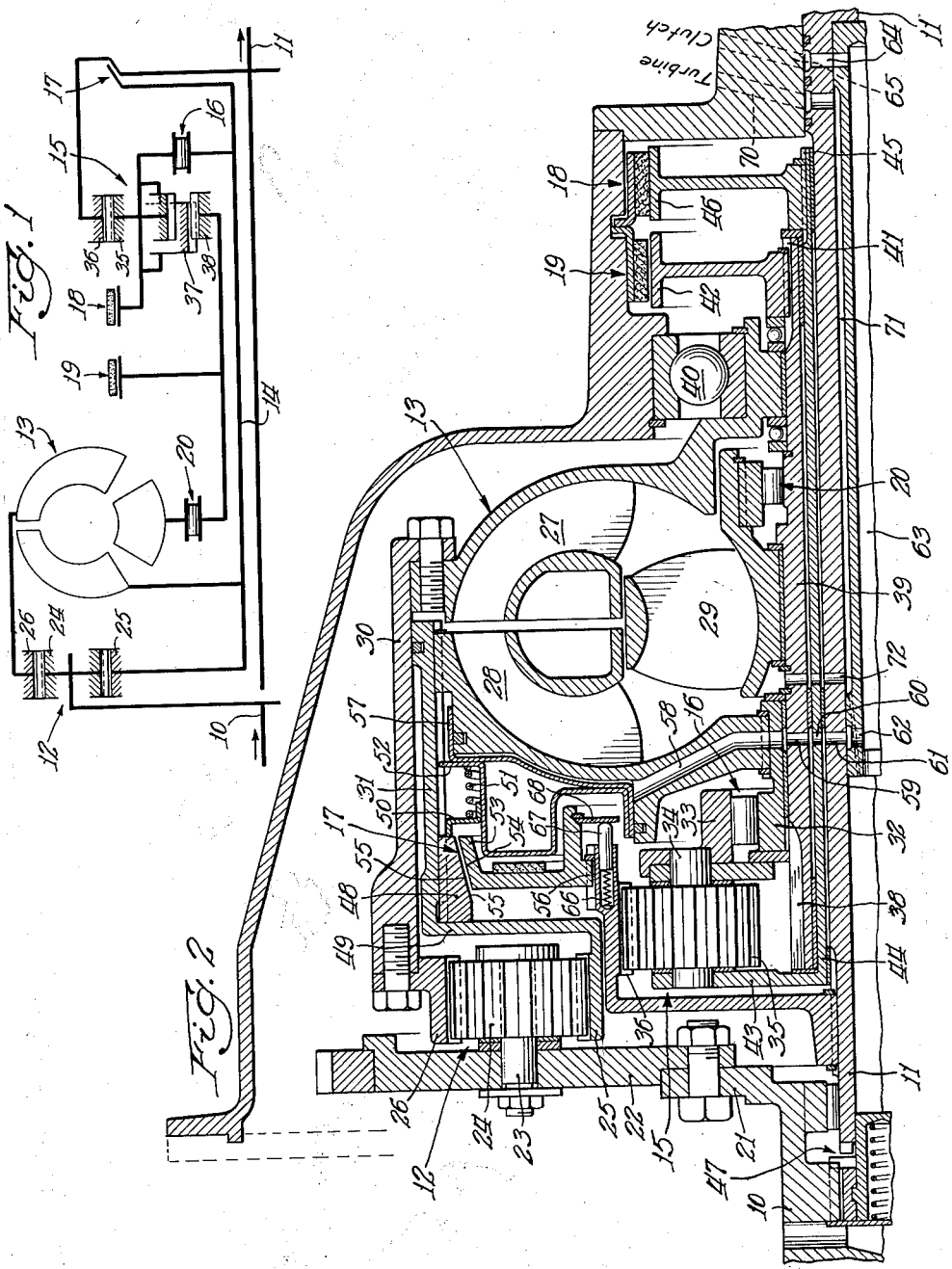
Inventor:
Donald W. Kelbel
By Edward C. Gritzbaugh
Atty.

Patented June 18, 1946

2,402,164

UNITED STATES PATENT OFFICE 2,402,164

HYDRODYNAMIC COUPLING COMBINED WITH GEARING

Donald W. Kelbel, Muncie, Ind., assignor to Borg-Warner Corporation, Chicago, Ill., a corporation of Illinois Application March 21, 1944, Serial No. 527,502

13 Claims. (Cl. 74—189.5)

This invention relates to power transmitting devices and particularly to such devices which are comprised of a hydrodynamic coupling or torque converter combined with gearing.

The present invention is a modification of a prior transmission disclosed in a copending application of H. Carnagua and D. W. Kelbel, Serial No. 514,464 filed December 16, 1943. This prior transmission employed two sets of dual planet planetary gears, the two sets of planetary gears being spaced apart axially with a hydraulic torque converter positioned between the two planetary gear sets. The transmission provided two ranges of infinitely variable torque multiplication ratios, the gearing and converter being so connected that the converter handled only a fraction of the engine torque in either range. A reverse drive was provided by interchanging the functions of the driven and reaction elements of the converter.

The object of this invention is to provide a transmission which functions in a manner similar to that disclosed in the aforesaid copending application but which uses a planetary gear set having a single set of planets in place of one of the dual planet gear sets of the prior device.

Another object of this invention is to provide a transmission of the type described in the copending application wherein both planetary gear sets are mounted adjacent the flywheel and ahead of the torque converter.

A more specific object of this invention is to combine and locate the gears of a transmission of the type described in such a manner that one set of gears will be nested or telescoped within the other to shorten the transmission.

These and other objects of this invention will become readily apparent from the following detailed description when taken together with the accompanying drawing in which:

Fig. 1 is a functional diagram of the principal power transmitting elements and their connections; and Fig. 2 is a partial section through a preferred embodiment of this invention.

Referring now to the drawing for a general description of the invention and particularly to Fig. 1, the transmission is comprised of a drive shaft 10, a driven shaft 11, a first planetary gear set 12 connected directly to the drive shaft 10, a hydrodynamic torque converter 13 driven by the planetary gear set 12, an intermediate torque transmitting member 14 which receives torque from both the torque converter 13 and the planetary gear set 12, a second planetary gear set 15 which is connected to the intermediate torque transmitting member 14 by means of a one-way clutch 16, and a clutch 17 which when operative connects intermediate torque transmitting member 14 directly to driven shaft 11.

A brake 18 is provided for planetary gear set 15 which is effective through one-way clutch 16 to arrest the rotation of intermediate torque transmitting member 14 and the output members of planetary gear set 12 and torque converter 13 in order to provide a reverse drive as will be described hereinafter. A second brake 19 is provided to hold one of the members of the planetary gear set 15 to provide a fulcrum for torque multiplication through the gearing and, through the intermediary of a one-way coupling 20, to hold the reaction member of the hydraulic torque converter 13.

Referring now to Fig. 2 for a detailed description of the invention, the drive shaft 10 is provided with a flange 21 to which may be bolted or otherwise secured a flywheel 22. A plurality of axially extending pins 23 are mounted on flywheel 22 and serve as supports for planet pinions 24 of planetary gear set 12. Thus flywheel 22 and the pins 23 comprise a carrier for planetary gear set 12. In addition to planet pinions 24, said planetary gear set 12 includes a sun gear 25 and an internal or ring gear 26 both of which mesh directly with each of the planet pinions 24. The number of said planet pinions 24 may be determined by the torque to be transmitted through the planetary gear set.

Hydraulic torque converter 13 is comprised of a vaned pump or input element 27, a vaned turbine or output element 28 and a vaned stator or reaction element 29. The pump, turbine and reaction vanes are arranged to form a closed hydraulic circuit which is in the form of a torus. Pump element 27 is secured to a drum 30 which in turn is bolted or otherwise secured to ring gear 26 so that pump element 27 rotates at the same speed as ring gear 26. Turbine element 28 is splined to an inner drum 31 which may be made integrally with sun gear 25 so as to rotate therewith, said sun gear 25 being formed on a portion of the drum of reduced diameter. It will be noted that turbine element 28 is spaced from sun gear 25 to make room for other mechanism. Turbine element 28 is also splined to the cam member 32 of one-way clutch 16, the race member 33 of which supports a plurality of planet shafts 34 and thus forms the carrier for the planetary gear set 15.

The said planetary gear set 15 is comprised of a plurality of planet gears 35 which mesh with an internal or ring gear 36 and also with a second set of planet gears 37 (Fig. 1) which in turn mesh with a sun gear 38, the latter being formed on the end of a hollow shaft 39 which extends rearwardly through torque converter 13 and beyond a main bearing 40 where its free end 41 is splined to a brake drum 42 forming part of brake 19.

Planet pinion shafts 34 extend forwardly through planet pinions 35 and 37 and are received in a plate 43 which forms part of the planet pinion carrier and which is drivingly connected to a second hollow shaft 44 extending rearwardly through and beyond hollow shaft 39 so that its free end 45 may be splined to receive the brake drum 46 of brake 18.

Ring gear 36 is splined to driven shaft 11 which extends through the entire transmission to the vicinity of drive shaft 10 in which it is piloted. A ratchet type one-way coupling 47 serves to provide a drive from the driven shaft 11 to drive shaft 10 when it is desired to start the engine by moving the load, as for example, in a car, when it is desired to start the engine by pushing or towing the car. The details of construction of coupling 47 are described in the aforesaid copending application and hence will not be repeated here.

Clutch 17 is comprised of a ring 48 which is splined to inner drum 31 so as to be rotatable therewith and is normally held against a radial portion 49 on drum 31 by means of a stamping 50 and a spring 51. Said spring 51 abuts against a stamped pressure plate 52, the plate being designed to move axially to urge a movable clutch member 53 against clutch ring 48. Said clutch member 53 has a conical surface 54 which engages a conical surface 55 on ring 48 to couple the movable member to ring 48. Movable member 53 is splined at 56 to ring gear 36 so that when clutch 17 is engaged, turbine element 28 and sun gear 25 rotate with ring gear 36 and its associated driven shaft 11. Stamped pressure plate 52 is operated by a stamped piston 57 which is annular in shape and which is in hydraulic communication with a conduit 58 formed in the housing portion of turbine element 28. A plurality of axially aligned conduits 59, 60, 61 and 62 connect conduit 58 with a central conduit 63 in driven shaft 11 which in turn is in communication through conduits 64 and 65 with suitable control valves (not shown).

Spring 51 serves to return piston 57 to its nonoperative position, and a spring 66 positioned in an opening in ring gear 36 and pressing against a pin 67 and a washer 68 on movable member 53 serves to return the movable member 53 of clutch 17 to its released position.

The operation of the transmission is as follows:

The transmission is adapted to provide one infinitely variable reverse drive, neutral and two infinitely variable forward speed ranges. For neutral, brakes 18 and 19 are released as well as clutch 17. For the first forward speed range, brake 19 is applied, brake 18 is released and clutch 17 is likewise released. The drive is then from drive shaft 10 and flywheel 22 to planet pinions 24 of planetary gear set 12 where the power is split into two paths, one going to pump member 27 of hydraulic torque converter 13 and the other going to sun gear 25, both paths then being combined in drum 31 which corresponds to intermediate torque transmitting member 14 of Fig. 1. The power going into torque converter 13 is converted into a high torque, low speed drive in accordance with the conditions existing in the converter and is then transmitted through one-way clutch 16 to the planet carrier of the second planetary gear set 15. Since sun gear 38 of the second planetary gear set 15 is held against rotation through the intermediary of hollow shaft 39 and brake 19, as is also the reaction element 29 of torque converter 13, a reaction is established in the converter for a first torque multiplication and in the planetary gear set for a further torque multiplication. This multiplied torque is then transmitted to ring gear 36 which in turn transmits the multiplied torque directly to driven shaft 11.

At some predetermined speed clutch 17 will be engaged by means of fluid under pressure entering conduit 65 and the intermediate interconnecting conduits leading to piston 57. With clutch 17 engaged the turbine element 28 as well as sun gear 25 are connected through drum 31 and ring gear 36 to driven shaft 11. Since brake 19 remains applied and thereby continues to hold sun gear 38 against rotation, simultaneously with the engagement of clutch 17 ring gear 36 will drive planet carrier 33 at an overdrive ratio so that it overruns the turbine element 28 and drum 31. This overrunning action is permitted by the one-way clutch 16 which is positioned between the carrier 33 and the turbine element 28. In the higher range the torque converter 13 is still available for torque multiplication although the planetary gearing 15 has been rendered ineffectual for this purpose.

It will be noted that in either forward range since the sun gear 25 of the first planetary gear set 12 is connected to the load and the carrier or planet pinions 24 are connected to the drive shaft 10, ring gear 26 will be driven at an overspeed with respect to drive shaft 10, thereby driving the converter pump element 27 at an overspeed and permitting the use of a smaller torque converter for the same capacity. The size of the converter is also influenced downward by the fact that it is called upon to transmit only a fraction of the power available in shaft 10.

For reverse, brake 19 and clutch 17 are released and brake 18 is applied. This arrests the rotation of carrier 33 and through one-way clutch 16 prevents backward rotation of inner drum 31, sun gear 25 and turbine element 28. Since brake 19 is released, however, the stator element 29 of the converter will be free to rotate and this rotation will be transmitted through one-way coupling device 20 and hollow shaft 39 to sun gear 38. The shapes of the vanes of the turbine and stator elements are such that when the turbine element is held against rotation while the pump element 27 is being driven, the stator element 29 will be rotated in a reverse direction, and hence sun gear 38 will likewise be driven in a reverse direction. This reverse rotation is transmitted through the dual planet gears 37 and 35 to ring gear 36, planet pinions 35 acting as reverse idlers to cause ring gear 36 to rotate in the same direction as sun gear 38. Thus ring gear 36 will be driven backwardly and this backward rotation will be transmitted to driven shaft 11. It will be noted that in reverse, the pump element 27 is likewise driven at an overspeed with respect to drive shaft 10 inasmuch as sun gear 25 is held against rotation. The loss of torque through planetary gear set 12 because of this arrangement will be made up in the converter 13 and will be further increased in the planetary gear set 15.

It will be noted from Fig. 2 that the sun gear 25 of planetary gear set 12 is rather large in diameter and that the second planetary gear set 15 is telescoped within the sun gear 25 thereby shortening the axial dimensions of the transmission. It is desirable to have sun gear 25 of substantially the size shown for the reason that it is not advisable to run the pump element 27 at too great an overspeed with respect to drive shaft 10 and in order to get the proper overspeed with a planetary arrangement of the type shown it is necessary to increase the size of the sun gear. It has been found, for example, that a ratio of 1.66 to 1 between the speed of the pump element and the speed of the drive shaft is the most desirable and the gearing could therefore be designed to approach this ratio as nearly as is expedient. By telescoping one planetary gear set within the other, the torque converter 13 may be moved closer to the flywheel which results in shorter drums 30 and 31 and hence a further economy in weight and cost.

It will also be noted that the arrangement of the parts shown in Fig. 2 results in the placing of the parts of clutch 17 in close proximity to the devices to be coupled without requiring long connecting shafts, drums, rods and the like.

The torque converter 13 is preferably operated while it is filled with oil or other fluid under constant pressure to avoid cavitation and a resultant loss in efficiency. This oil may be supplied to the turbine through a conduit 70 which is in communication with a passageway 71 in driven shaft 11 which in turn communicates with the interior of torque converter 13 through suitable radial passageways 72 in the concentric shafts.

It is understood that the foregoing description is merely illustrative of a preferred embodiment of the invention and that the scope of the invention therefore is not to be limited thereto but is to be determined by the appended claims.

I claim:

1. A variable speed transmission comprising drive and driven shafts, differential gearing connected to the drive shaft and splitting the power into two paths, an infinitely variable torque-modifying device in one path and mechanical power transmitting means in the other path, means uniting the two paths, and differential gearing drivingly connected between the uniting means and the driven shaft for further modifying the torque, said second mentioned differential gearing being nested within the first differential gearing.

2. A variable speed transmission comprising drive and driven shafts, differential gearing connected to the drive shaft and splitting the power into two paths, said differential gearing comprising intermeshed sun, planet and ring gears, an infinitely variable torque-modifying device in one path and mechanical power transmitting means in the other path, means uniting the two power paths, and differential gearing drivingly connected between the uniting means and the driven shaft for further modifying the torque, said second-mentioned differential gearing being nested substantially within the sun gear of the first mentioned differential gearing.

3. A variable speed transmission comprising drive and driven shafts, differential gearing connected to the drive shaft and splitting the power into two paths, said differential gearing comprising planet pinions, a carrier for the planet pinions, said planet carrier being rotatable with the drive shaft, sun and ring gears meshing with the planet pinions, an infinitely variable torque-modifying device driven by the ring gear and having an output member connected to the sun gear so as to combine the two power paths, and differential gearing drivingly connected between said combined power path and the driven shaft for further modifying the torque, said second mentioned differential gearing including ring, planet and sun gears, said ring gear being telescoped within the sun gear of the first-mentioned differential gearing.

4. A variable speed transmission as described in claim 3, said driven shaft extending through the transmission and being piloted in the drive shaft and the ring gear of the second differential gearing being directly connected to the driven shaft.

5. A variable speed transmission comprising drive and driven shafts, a flywheel connected to rotate with the drive shaft, axially extending shafts mounted on the flywheel, planet pinions mounted on the axially extending shafts, sun and ring gears meshing with the planet pinions, an infinitely variable torque modifying device driven by the ring gear and having an output member connected to the sun gear, and differential gearing drivingly connected between said output member and said driven shaft for further modifying the torque, said last mentioned gearing being nested within the sun gear.

6. A variable speed transmission as described in claim 5, said last-mentioned gearing comprising a ring gear, a sun gear, planet gears in mesh with the ring and sun gear and a carrier for the planet gears, means for connecting the carrier of the last-mentioned gearing to the output member of the infinitely variable torque-modifying device, clutch means for connecting the first sun gear to the ring gear of said last-mentioned gearing and means connecting the ring gear of said last-mentioned gearing directly to the driven shaft.

7. A variable speed transmission comprising drive and driven shafts, differential gearing connected to the drive shaft and splitting the power into two paths, said gearing comprisng a planet pinion carrier rotatable with the drive shaft, planet pinions mounted on said planet pinion carrier, a ring gear in mesh with the planet pinions, a drum secured to the ring gear, a sun gear meshing with the planet pinions, said sun gear comprising a drum mounted within the first mentioned drum and having a portion of reduced diameter on which the sun gear is formed, an infinitely variable torque modifying device having an input element connected to the first drum and an output element connected to the second drum and spaced from the sun gear, differential gearing for further modifying the torque, said second-mentioned differential gearing being nested within the sun gear and having a ring gear directly connected to the driven shaft, and clutch means in the space between the output element of the infinitely variable torque-modifying device and the sun gear for connecting the second-mentioned drum directly to the ring gear of the second-mentioned differential gearing.

8. A variable speed transmission as described in claim 7, said clutch means comprising a clutch member rotatable with the second-mentioned drum, a cooperating clutch member rotatable with the ring gear of the second-mentioned diferenial gearing, and fluid means for causing the two clutch members to engage.

9. A variable speed transmission as described in claim 7, and hydraulic means for engaging the clutch, said means comprising an annular hydraulic cylinder formed by the second-mentioned drum and the exterior surface of the output member, and an annular piston in said cylinder movable into direct contact with the clutch means.

10. A variable speed transmission as described in claim 7, said clutch means comprising a clutch member splined to the second-mentioned drum, a cooperating clutch member splined to the exterior of the ring gear of the second-mentioned differential gearing, and fluid means for causing the two clutch members to engage.

11. A variable speed transmission comprising drive and driven shafts, differential gearing connected to the drive shaft and splitting the power into two paths, an infinitely variable torque-modifying device having an output element in one path and mechanical power transmitting means in the other path, means uniting the two paths, differential gearing for further modifying the torque, a one-way clutch drivingly connected between said output element and the second-mentioned differential gearing, said second-mentioned differential gearing being nested within the sun gear and having a ring gear directly connected with the driven shaft and a planet gear carrier connected with said one-way clutch, and clutch means for connecting the mechanical power transmitting means directly to the ring gear of the second-mentioned differential gearing.

12. A variable speed transmission comprising drive and driven shafts; a fly wheel connected to rotate with the drive shaft; axially extending shafts mounted on the fly wheel; planet gears mounted on the axially extending shafts; sun and ring gears meshing with the planet gears; an infinitely variable torque-modifying device driven by the ring gear and having an output member connected to the sun gear; differential gearing drivingly connected between said output member and said driven shaft for further modifying the torque, said last-mentioned gearing being nested within said sun gear and comprising a ring gear, a sun gear, planet gears in mesh with said ring and sun gears and a carrier for the planet gears; a one-way clutch for connecting the planet gear carrier of said last-mentioned gearing to the output member of the infinitely variable torque-modifying device; clutch means for connecting the first-mentioned sun gear to the ring gear of said last-mentioned gearing, and means connecting the ring gear of said last-mentioned gearing directly to the driven shaft.

13. A variable speed transmission comprising drive and driven shafts, differential gearing connected to the drive shaft and splitting the power into two paths, said gearing comprising a planet pinion carrier rotatable with the drive shaft, planet pinions mounted on said planet pinion carrier, a ring gear in mesh with the planet pinions, a drum secured to the ring gear, a sun gear meshing with the planet pinions, said sun gear comprising a drum mounted within said first-mentioned drum and having a portion of reduced diameter on which the sun gear is formed, an infinitely variable torque-modifying device having an input element connected to the first drum and an output element connected to the second drum and spaced from the sun gear, differential gearing for further modifying the torque, a one-way clutch drivingly connected between said output element and the second-mentioned differential gearing, said second-mentioned differential gearing being nested within the sun gear and having a ring gear directly connected with the driven shaft and a planet gear carrier connected with said one-way clutch, and clutch means in the space between the output element of the infinitely variable torque-modifying device and the sun gear for connecting the second-mentioned drum directly to the ring gear of the second-mentioned differential gearing.

DONALD W. KELBEL.